(12) United States Patent
Choi

(10) Patent No.: US 9,618,356 B2
(45) Date of Patent: Apr. 11, 2017

(54) NAVIGATION APPARATUS AND METHOD OF CONTROLLING THE SAME

(71) Applicant: HYUNDAI MOTOR COMPANY, Seoul (KR)

(72) Inventor: Kwang Hun Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/536,006

(22) Filed: Nov. 7, 2014

(65) Prior Publication Data

US 2015/0192427 A1 Jul. 9, 2015

(30) Foreign Application Priority Data

Jan. 6, 2014 (KR) .................. 10-2014-0001569

(51) Int. Cl.
*G01C 21/36* (2006.01)
(52) U.S. Cl.
CPC ..... *G01C 21/3667* (2013.01); *G01C 21/3647* (2013.01)
(58) Field of Classification Search
CPC .................. G01C 21/3667; G01C 21/3647
USPC ........................................................ 701/431
See application file for complete search history.

(56) References Cited

U.S. PATENT DOCUMENTS

2012/0303270 A1* 11/2012 Su ...................... G01C 21/3415
701/431

FOREIGN PATENT DOCUMENTS

| JP | 2002-260200 A | 9/2002 | | |
|---|---|---|---|---|
| JP | 2004-20292 A | 1/2004 | | |
| JP | 2006-064414 A | 3/2006 | | |
| JP | 2006-126402 A | 5/2006 | | |
| JP | 2008-241276 A | 10/2008 | | |
| JP | 2010-8073 A | 1/2010 | | |
| KR | 2007-0050157 A | 5/2007 | | |
| KR | 2007-0059321 A | 6/2007 | | |
| KR | 20070059321 A | * | 6/2007 | ........... G08G 1/0969 |
| KR | 2008-0003677 A | 1/2008 | | |
| KR | 2009-0050543 A | 5/2009 | | |

OTHER PUBLICATIONS

Korean Notice of Allowance issued in Korean Application No. 10-2014-0001569 dated Dec. 1, 2015, with English Translation.

* cited by examiner

*Primary Examiner* — Brian P Sweeney
(74) *Attorney, Agent, or Firm* — McDermott Will & Emery LLP

(57) ABSTRACT

A navigation apparatus includes storage configured to store a graphic map and a photographic map, a controller configured to control to convert the photographic map into the graphic map to display the graphic map when the photographic map and actual topography or the photographic map and the graphic map include mutually different positions in a photographic map display mode, and a display configured to display the graphic map or the photographic map and display a current position of a vehicle on the graphic map or the photographic map.

4 Claims, 12 Drawing Sheets

(a)  (b)  (c)

NAVIGATION APPARATUS AND METHOD OF CONTROLLING THE SAME

CROSS-REFERENCE TO RELATED APPLICATION

This application claims benefit of priority to Korean Patent Application No. P2014-1569, filed on Jan. 6, 2014 in the Korean Intellectual Property Office, the entire content of which is incorporated herein by reference.

TECHNICAL FIELD

The present inventive concept relates to a navigation apparatus that displays a current position of a vehicle and route on an aerial photography map by matching the current position of the vehicle and route on the aerial photography map and a method of controlling the same.

BACKGROUND

In general, a navigation apparatus is an apparatus that receives position information respectively from satellites through a large number of Global Positioning Systems (hereinafter, referred to as "GPS") to calculate a current position of a vehicle, displays the calculated current position on a map by performing map matching of the calculated current position on the map, receives a destination from a user to perform route search from the calculated current position to the destination in accordance with a predetermined route search algorithm, displays the searched route on the map by matching the searched route on the map, and guides the user to the destination along the displayed route.

The navigation apparatus may enlarge and display a graphic map so that the user can clearly discern an advancing road at an intersection where roads cross each other when guiding a route, or display a graphic map having an existing scale at one side of a screen of the navigation apparatus and display a graphic map with the intersection enlarged at the other side thereof using a two-split screen function.

Here, the intersection refers to an intersection with three ways or more, an interchange of an overpass or an underpass, an interchange of a highway, or the like.

As described above, the navigation apparatus graphically classifies and represents right turns, left turns, intersections, bridges, and general roads, and therefore there may be many differences between an area displayed by the navigation apparatus and the actual area of a driver.

In addition, since there may be many differences between the area displayed by the navigation apparatus and the actual area of the driver, the driver may be confused to cause a safety problem.

SUMMARY

Therefore, an aspect of the present inventive concept provides a navigation apparatus that stores position information of a photographic map different from actual topography, and automatically converts and displays the photographic map and a graphic map based on the stored position information, and a method of controlling the same.

Another aspect of the present inventive concept provides a navigation apparatus that stores position information of a photographic map different from actual topography inputted by a user, and automatically converts and displays the photographic map and a graphic map based on the stored position information, and a method of controlling the same.

Still another aspect of the present inventive concept provides a navigation apparatus that compares a photographic map and a graphic map, verifies and stores corresponding position information when the photographic map and the graphic map are not matched with each other, and automatically converts and displays the photographic map and the graphic map based on the stored position information.

Additional aspects of the inventive concept will be set forth in part in the description which follows and, in part, will be obvious from the description, or may be learned by practice of the inventive concept.

One aspect of the present inventive concept relates to a navigation apparatus includes storage, a controller, and a display. The storage is configured to store a graphic map and a photographic map. The controller controls to convert the photographic map into the graphic map to display the graphic map when the photographic map and actual topography or the photographic map and the graphic map include mutually different positions in a photographic map display mode. The display is configured to display the graphic map or the photographic map and display a current position of a vehicle on the graphic map or the photographic map.

The navigation apparatus may further include a communication unit configured to receive a position of the photographic map non-matched with the actual topography.

The navigation apparatus may further include an input configured to receive a position of the photographic map non-matched with the actual topography.

The controller may be configured to determine whether to perform matching by comparing the graphic map and the photographic map.

Another aspect of the present inventive concept encompasses a navigation apparatus including storage, a communication unit, a controller and a display. The storage is configured to store a graphic map for each position and a photographic map for each position. The communication unit is configured to receive a position of the photographic map non-matched with actual topography. The controller is configured to control the received position to be stored as a non-matched position, determine whether a current position of a vehicle is the non-matched position when a map display mode is the photographic map display mode, and convert the photographic map into the graphic map to display the graphic map when the current position of the vehicle is the non-matched position. The display is configured to display the graphic map or the photographic map and display the current position of the vehicle.

The communication unit may be configured to perform communication with a server, and receive, from the server, the position of the photographic map non-matched with the actual topography.

The communication unit may be configured to receive the position of the photographic map non-matched with the actual topography through a broadcasting network.

The controller may be configured to control to maintain a display of the graphic map when the current position of the vehicle is within a predetermined radius from the non-matched position, and control to convert the graphic map into the photographic map when the current position of the vehicle is outside the predetermined radius from the non-matched position.

Still another aspect of the present inventive concept relates to a navigation apparatus including storage, an input, a controller and a display. The storage is configured to store a graphic map for each position and a photographic map for each position. The input is configured to receive a position of the photographic map non-matched with actual topography. The controller is configured to control the received position to be stored as a non-matched position, determine whether a current position of a vehicle is the non-matched position when a map display mode is a photographic map display mode, and control to covert the photographic map into the graphic map to display the graphic map when the current position of the vehicle is the non-matched position. The display is configured to display the graphic map or the photographic map, and display the current position of the vehicle on the displayed graphic map or photographic map by matching the current position of the vehicle on the displayed graphic map or photographic map.

When a non-matched position setting mode is inputted and any one point is selected, the controller may be configured to set a predetermined radius from the selected point as a non-matched range.

The controller may be configured to control to maintain a display of the graphic map when the current position of the vehicle is within the non-matched range, and control to convert the graphic map into the photographic map when the current position of the vehicle is outside the non-matched range.

When a non-matched position setting mode is inputted and any one point is selected, the controller may be configured to verify an administrative district of the selected point, and set the verified administrative district as a non-matched range.

The controller may be configured to control to maintain a display of the graphic map when the current position of the vehicle is within the non-matched range, and control to convert the graphic map into the photographic map when the current position of the vehicle is outside the non-matched range.

When a non-matched position setting mode is inputted and a point is continuously touched by a user, the controller may be configured to verify a map position corresponding to the continuous touch point, and set the verified map position as a non-matched range.

The controller may be configured to control to maintain a display of the graphic map when the current position of the vehicle is within the non-matched range, and control to convert the graphic map into the photographic map when the current position of the vehicle is outside the non-matched range.

Yet another aspect of the present inventive concept relates to a navigation apparatus including storage, a controller, and a display. The storage is configured to store a graphic map for each position and a photographic map for each position. The controller is configured to control to compare the graphic map and the photographic map for each position, verify a position of the photographic map different from the graphic map, and store the verified position as a non-matched position, and control to determine whether a current position of a vehicle is the non-matched position when a map display mode is a photographic map display mode and convert the photographic map into the graphic map to display the graphic map when the current position of the vehicle is the non-matched position. The display is configured to display the graphic map or the photographic map, and display the current position of the vehicle on the displayed graphic map or photographic map by matching the current position of the vehicle on the displayed graphic map or photographic map.

The controller may be configured to verify a display area displayed in the display during traveling and a map position of a non-display area continuous to the display area, and determine whether the verified map position is the non-matched position.

A further aspect of the present inventive concept encompasses a method of controlling a navigation apparatus including comparing a graphic map stored in storage and a photographic map for each position; verifying a position of the photographic map different from the graphic map. The verified position is controlled to be stored as a non-matched position; determining whether a current position of a vehicle is the non-matched position when a map display mode is a photographic map display mode. The photographic map is converted into the graphic map to display the graphic map when the current position of the vehicle is the non-matched position.

In controlling the navigation apparatus, the graphic map may be displayed in which the current position of the vehicle is matched when the map display mode is a graphic map display mode.

In controlling the navigation apparatus, a position of the photographic map different from actual topography may be received through a communication network, and the received position may be stored as the non-matched position.

In controlling the navigation apparatus, a position of the photographic map different from actual topography may be received from a user, and the received position may be stored as the non-matched position.

In the receiving of the position of the photographic map, when a non-matched position setting mode is inputted and any one point is selected, a predetermined radius from the selected point may be set as a non-matched range.

In the receiving of the position of the photographic map, when a non-matched position setting mode is inputted and any one point is selected, an administrative district of the selected point may be verified, and the verified administrative district may be set as a non-matched range.

In the receiving of the position of the photographic, when a non-matched position setting mode is inputted and a point is continuously touched by a user, a map position corresponding to the continuous touch point may be verified, and the verified map position may be set as a non-matched range.

In controlling the navigation apparatus, a predetermined radius from the non-matched position may be set as a non-matched range, and storing the set non-matched range.

In controlling the navigation apparatus, a display of the graphic map may be maintained when the current position of the vehicle is within a non-matched range, and the graphic map may be converted into the photographic map to display the photographic map when the current position of the vehicle is outside the non-matched range.

BRIEF DESCRIPTION OF THE DRAWINGS

These and/or other aspects of the inventive concept will become apparent and more readily appreciated from the following description of the embodiments, taken in conjunction with the accompanying drawings of which like reference characters may refer to the same or similar parts throughout the different views. The drawings are not necessarily to scale, emphasis instead being placed upon illustrating the principles of the embodiments of the present inventive concept. In the drawings, the thickness of layers and regions may be exaggerated for clarity.

DETAILED DESCRIPTION

Figure 1:
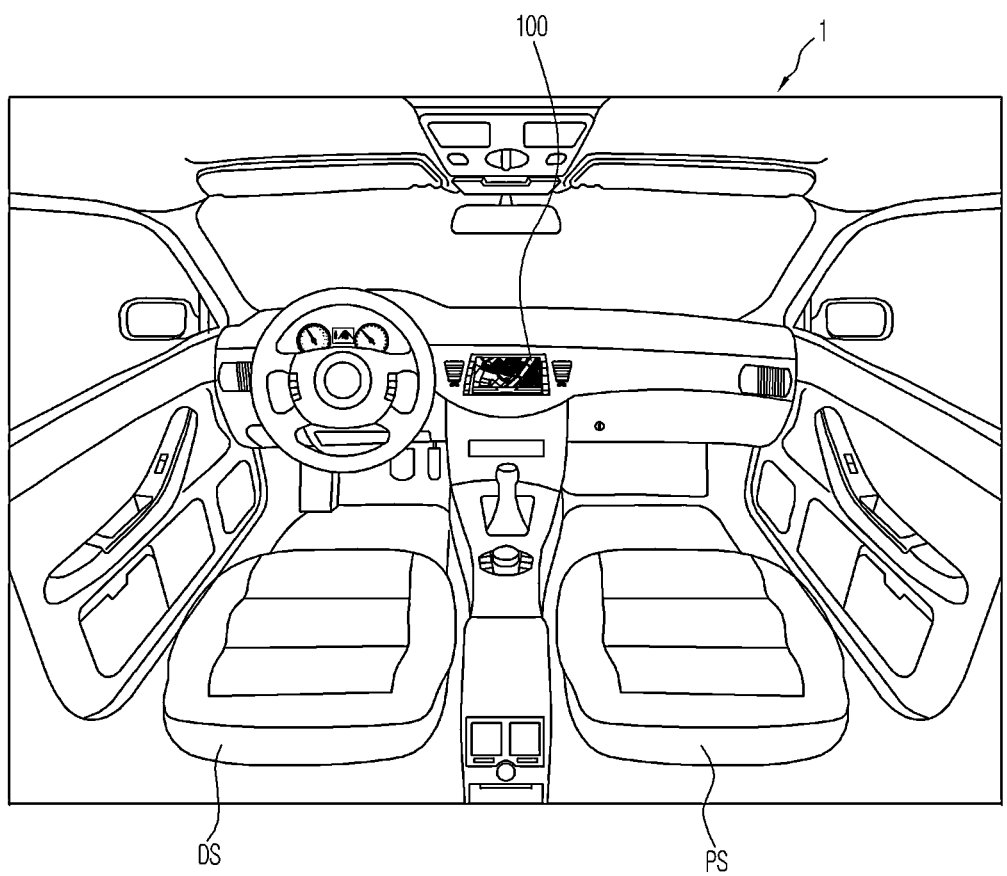
FIG. 1 is a view showing an example of a vehicle in which a terminal according to an embodiment of the present inventive concept is provided.

Reference will now be made in detail to the embodiments of the present inventive concept, examples of which are illustrated in the accompanying drawings, wherein like reference numerals refer to like elements throughout.

FIG. 1 is a view showing an example of a vehicle in which a terminal according to an embodiment of the present inventive concept is provided.

As shown in FIG. 1, a vehicle 1 may be a device that travels by driving wheels for the purpose of transporting human beings or cargo and moves on the road.

The vehicle 1 may include a vehicle body having an interior unit and an exterior unit and a chassis in which machinery required for traveling is installed as the remaining part excluding the vehicle body.

The exterior unit of the vehicle body may include a front panel, a hood, a roof panel, a rear panel, a trunk, front, rear, left and right doors, and the like.

The exterior unit of the vehicle body further may include fillers provided in the boundaries among the front panel, the hood, the roof panel, the rear panel, the trunk, and the front, rear, left, and right doors, and also may further include side window glasses installed in the front, rear, left, and right doors, quarter window glasses installed between the fillers so as not to be opened and closed, a rear window glass installed at the rear side of the vehicle, and a front window glass installed at the front side thereof.

The interior unit of the vehicle may include seats on which occupants are seated, a dashboard, a speedometer disposed on the dash board to output traveling-related information, a fuel gauge, an automatic transmission selector lever indicator, a tachometer, a gauge board 210 such as a trip meter, steering wheels for operating the direction of the vehicle, a center fascia in which audio and air conditioner control panels are provided, and the like.

Here, the seats may include a driver's seat (DS), a passenger seat (PS) on which a passenger is seated, and rear seats positioned at the inner rear side of the vehicle.

The center fascia may be a control panel of the dash board provided between the driver's seat and the passenger seat, and in the center fascia, audio equipment, an operation unit for adjusting an air conditioner and a heater, a ventilator, a cigarette jack, and the like may be installed.

The chassis of the vehicle may include a power generating apparatus, a power transmission apparatus, a driving apparatus, a steering apparatus, a braking apparatus, a suspension apparatus, a transmission, a fuel apparatus, front/rear/left/right wheels, and the like.

In addition, in the vehicle, various safety devices for safety of the driver and occupants may be provided. Here, as the safety devices of the vehicle, an air bag control device for the purpose of safety of the driver and occupants at the time of a vehicle collision, an electronic stability control (ESC) device for controlling the posture of the vehicle at the time of acceleration or cornering of the vehicle, and the like may be used.

In addition, in the vehicle, a navigation apparatus 100, a hands-free device, a Global Positioning System (GPS), audio equipment, a Bluetooth device, a rear camera, and the like for the purpose of convenience of the driver may be further provided.

Of these, the navigation apparatus 100 may calculate a current position of the vehicle based on position information provided from a plurality of satellites, and display the current position of the vehicle on a map by matching the current position of the vehicle on the map.

In addition, the navigation apparatus 100 may be an apparatus which receives a destination from a user, perform route search from the current position of the vehicle to the destination based on a route search algorithm, display the searched route on a map by matching the searched route on the map, and guide the user to the destination through the route.

Such a navigation apparatus 100 may display a photographic map or a graphic map in accordance with a user's selection to guide a route. In addition, the navigation apparatus 100 can display the photographic map and the graphic map together with each other.

In addition, the navigation apparatus 100 may automatically convert and display the photographic map or the graphic map in accordance with whether change information of topography of a specific position is applied to the photography map.

Such a navigation apparatus will be described herein with reference to FIGS. 2 and 3.

Figure 2:
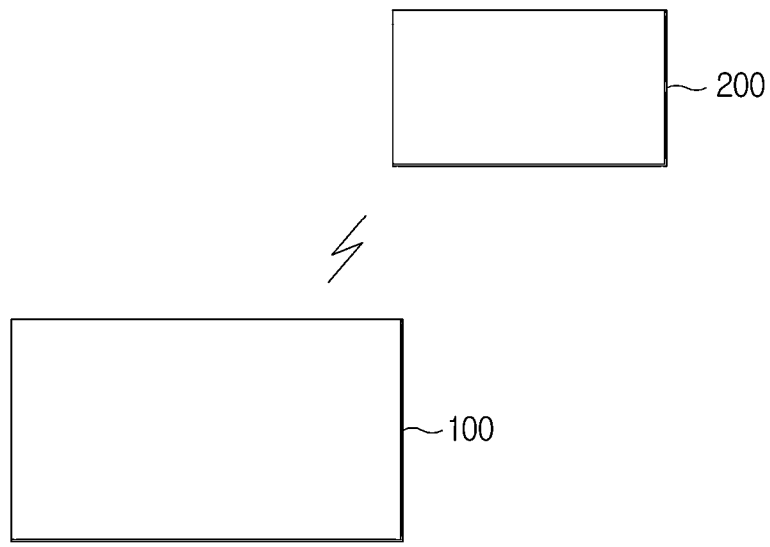
FIG. 2 is a view showing an example of a navigation apparatus in a vehicle according to an embodiment of the present inventive concept.
Figure 3:
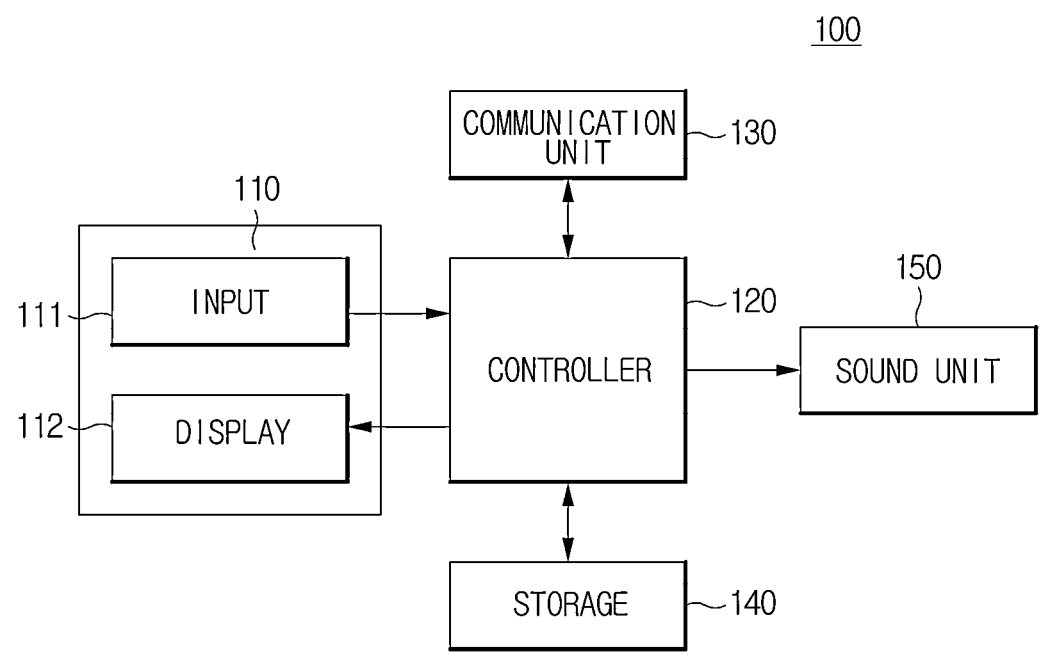
FIG. 3 is a control configuration view showing a navigation apparatus in a vehicle according to an embodiment of the present inventive concept.

FIG. 2 is a view showing an example of a navigation apparatus in a vehicle according to an embodiment of the present inventive concept, and FIG. 3 is a control configuration view showing a navigation apparatus in a vehicle according to an embodiment of the present inventive concept.

As shown in FIG. 2, the navigation apparatus 100 may perform communication with an external device or a server 200 through a wired/wireless communication network, and receive a photographic map and a graphic map, change information of topography from the external device or the server.

Such a navigation apparatus will be described in more detail with reference to FIG. 3.

As shown in FIG. 3, the navigation apparatus 100 may includes a user interface unit 110, a controller 120, a communication unit 130, storage 140, and a sound unit 150.

The user interface unit 110 may receive a command from a user, and displays a map for guiding a route, road environment information, and operation information on the user's command.

Such a user interface unit 110 may include an input 111 and a display 112.

Here, the input 111 can be implemented by a touch panel, and the display 112 can be implemented by a flat display panel such as LCD. That is, the user interface unit 110 can be implemented by a touch screen in which a touch panel and a flat display panel are integrally formed.

In addition, the input 111 may further include at least one physical button such as a power on/off button or the like.

Such an input 111 may transmit signals about a button selected by a user to the controller 120, and transmit signals of a position touched on the touch panel to the controller 120.

The input 111 may receive a route guidance command and destination information from a user, and transmit the received destination information to the controller 120.

The input 111 may receive a map display mode for displaying a map. That is, the input 111 may select types of a map to be displayed on the display.

Here, the map display mode may include a first display mode for displaying a graphic map, and a second display mode for displaying a photographic map.

The display 112 may display a map related to traveling information, environment information of roads, and route guidance information. That is, the display 112 may display a map on which a current position of a vehicle is matched, an operation state of the vehicle, and other additional information.

The display 112 may display the photographic map or the graphic map when displaying the map.

In addition, the photographic map and the graphic map can be displayed together in accordance with a user's command.

The display 112 can display telephone call-related information or music reproduction-related information, or display external broadcasting signals as videos.

The display 112 can display information related to updating of the photography map.

The display 112 can display a map display mode selected by a user.

In addition, when displaying a map in a different map display mode from the map display mode selected by the user, the display 112 can display notification information indicating that the map display mode is automatically switched.

The controller 120 may control guidance of a road and a surrounding environment of the road with respect to the current position of the vehicle in a general guidance mode when a destination is not inputted. The controller 120 may a microprocessor, a memory, and the like.

When the destination is inputted, the controller 120 may perform control in a route guidance mode, and in this instance, search a route from the current position of the vehicle to the destination, map-match the searched route on a map, and then guide the route from the current position of the vehicle to the destination while displaying the map-matched map.

More specifically, when the destination information is transmitted, the controller 120 may combine a plurality of roads between the current position of the vehicle and the destination to search a plurality of routes, calculate costs of the searched plurality of routes, search a route having the lowest cost among the calculated costs, and guide the vehicle from the current position of the vehicle to the destination along the searched route.

In addition, any one route among the plurality of routes may be received from a user.

When the vehicle is deviated from the guided route, the controller 120 may search again a route from the deviated position to the destination to provide the searched route to the user.

When the first display mode is inputted to the input 111, the controller 120 may control the graphic map to be displayed in the display 112, and display the current position of the vehicle on the graphic map by matching the current position of the vehicle on the graphic map.

When the second display mode is inputted to the input 111, the controller 120 may control the photographic map to be displayed in the display 112, and display the current position of the vehicle on the photographic map by matching the current position of the vehicle on the photographic map.

The controller 120 may determine whether the current position of the vehicle is a non-matched position while performing the second display mode, control to convert the photographic map into the graphic map when the current position of the vehicle is the non-matched position, and display the current position of the vehicle on the graphic map by matching the current position of the vehicle on the graphic map.

When receiving position information of the photographic map different from actual topography through the communication unit 130, the controller 120 may set the received position information as non-matched position information, and control the set non-matched position information to be stored in the storage 140.

Here, the photographic map may be a photographic map of actual topography photographed by satellites and aircrafts.

In addition, when receiving the non-matched position information, the controller 120 may set any one point of the non-matched position as a center point, set a range within a predetermined radius from the set center point as a non-matched range, and store information about the set non-matched range.

That is, when the current position of the vehicle is within the non-matched range, the controller 120 may control to convert the photographic map displayed in the display 12 into the graphic map.

In this instance, the controller 120 can control information about the map display mode selected by the user to be displayed in the display 112. Through this, the user can discern that the second display mode is selected by the user but the graphic map is temporarily displayed.

When the current position of the vehicle is determined to be outside the non-matched range, the controller 120 may control to convert the graphic map displayed in the display 112 again into the photographic map.

In this instance, the controller 120 may control the photographic map on which the current position of the vehicle is matched to be displayed in the display 112.

When receiving the photographic map and the graphic map which concern the same position stored in the storage 140, the controller 120 may update the stored photographic map or graphic map.

The communication unit 130 may perform communication with an external device and the server 200 through a wired/wireless communication network.

Here, the wired/wireless communication network may include a broadcasting network such as TPEG, SXM, or RDS of DMB.

The communication unit 130 may receive a photographic map for each position and a graphic map for each position, also receive position information of the photographic map different from actual topography, and transmit the received photographic map for each position and graphic map for each position, and the received position information of the photographic map different from the actual topography to the controller 120.

The navigation apparatus 100 may further include a port such as Universal Serial Bus (USB) provided in the main body, and the communication unit 130 may perform communication with the external device connected to the port or the like.

The communication unit 130 may further include USB communication, and transmit a setup program received through the USB communication, updating information, or the like to the controller 120.

That is, the navigation apparatus 100 can receive the position information of the photographic map different from the actual topography through map contents, a map program, and a map application of the external device connected to the port (not shown).

The communication unit 130 may further include a Global Positioning System (GPS) unit (not shown).

The GPS unit may receive position signals from each of a large number of GPS satellites to calculate its own position, and transmit, when its own position (that is, vehicle's position) is calculated, the calculated position to the controller 120. Here, the GPS unit may include a GPS antenna (ANT) that receives satellite signals from the large number of GPS satellites, an acceleration sensor (not shown) that measures acceleration of the vehicle, and a direction sensor (not shown) that detects the direction of the vehicle, and transmits acceleration data and direction data together with the current position of the vehicle to the controller 120.

The storage 140 may store the graphic map for each position and the photographic map for each position.

The storage 140 may store the non-matched position and the non-matched range transmitted from the controller 120.

Here, the graphic map may have topography over the whole country which are matched in accordance with lines of longitude and latitude, roads on the topography, names of the roads, lane information, information about changing points of roads, and the like. Here, the changing points of the roads refer to points such as points where lanes are changed in arbitrary roads, intersections, and the like.

The sound unit 150 may output sounds related to routes, traveling information, a map display mode changing alarm, music, video, and the like.

The server 200 may store the photographic map and the graphic map on which position information, road environment information, and name information are matched, and transmit the photographic map for each position and the graphic map for each position to the navigation apparatus 100 from which map request signals are transmitted.

The server 200 may receive, from an administrator, information about a position whose topography is changed after the photographing time at which aerial photographs or satellite photographs are taken, store the received position information, and transmit the stored position information to the navigation apparatus 100.

Here, the transmitting of the position information to the navigation apparatus 100 may include transmitting to the navigation apparatus 100 which a pre-registered user possesses.

In addition, the server 200 can receive, from pre-registered users, information about a position whose topography is changed through communication, and provide the received information to other users.

The server 200 can transmit the updated photography map together with the position information, and transmit the graphic map together with the position information.

The server 200 may include a server of a company for providing aerial photographs, a server of a company for manufacturing a navigation apparatus, or the like.

When the graphic map is updated, the server 200 can compare the updated graphic map and the stored photographic map for each position to determine whether the two maps are matched with each other. When it is determined that the two maps are not matched with each other, the server 200 can determine that corresponding topography is changed, verify a position whose topography is changed, and transmit information about the verified position to the navigation apparatus 100.

Such a server 200 can receive the graphic map from the server of the company for providing the graphic map.

In addition, the server 200 can verify an update date and time of each of a graphic map and a photographic map of the same position, and transmit position information of the graphic map to the navigation apparatus 100 when the two maps are not matched with each other in a state in which the update date and time of the photographic map are more recent than the update and time of the graphic map.

In this instance, the navigation apparatus 100 can convert the graphic map displayed in the display 112 into the photographic map when the current position of the vehicle is the non-matched position in a state in which the map display mode is the first display mode.

Figure 4:
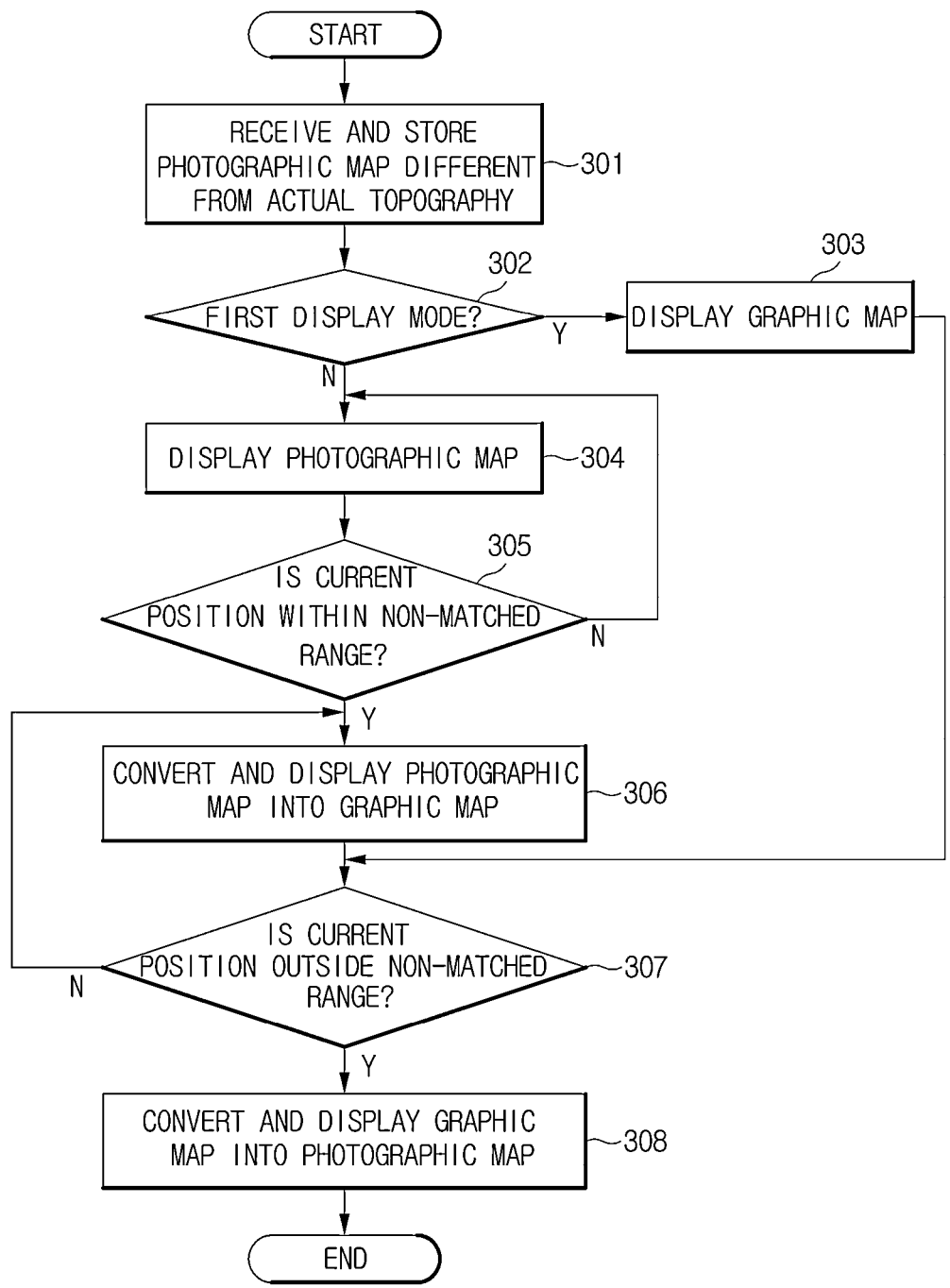
FIG. 4 is a control flowchart showing a navigation apparatus in a vehicle according to an embodiment of the present inventive concept.

FIG. 4 is a control flowchart of a navigation apparatus according to an embodiment of the present inventive concept, which will be described with reference to FIGS. 5A and 5B.

The navigation apparatus 100 may receive a photographic map and a graphic map from an external device when installing a program, and may store the received maps.

The navigation apparatus 100 can receive at least one of the photographic map and the graphic map from the server 200 at the time of initial installation of the program, and store the received map together with the position information.

The navigation apparatus 100 may perform communication with the server 200 even in the standby state in which power is applied, verify, when receiving the at least one of the photographic map and the graphic map from the server 200 in a state in which the photographic map and the graphic map for each position are stored in the storage 140, a position of the received map, and update a map of the same position as the verified position among the maps stored in the storage 140.

In addition, in operation 301, the navigation apparatus 100 may receive information about a position whose actual topography is changed from the server 200, and store the received position information as non-matched position information which is not matched with the photographic map.

Here, the position whose actual topography is changed may be a position in which the actual topography is different from the photographic map stored in the server due to changes in the topography.

In addition, when receiving the non-matched position information, the navigation apparatus 100 can set any one point of the non-matched position as a center point, and set a range within a predetermined radius from the set center point as a non-matched range to store the set non-matched range.

When a route guidance mode is selected among a DMB mode, a radio mode, and the route guidance mode, the navigation apparatus 100 may receive the position of the vehicle through the GPS unit of the communication unit 130.

The navigation apparatus 100 may verify a map display mode selected by a user, determine whether the verified map display mode is a first display mode in operation 302, and guide a route while displaying the graphic map on which the current position of the vehicle is matched in the display 112 in operation 303 when the verified map display mode is determined to be the first display mode.

In addition, the navigation apparatus 100 may output traveling information, surrounding environment information of roads, and the like through the display and the sound unit.

In such a navigation apparatus 100, the first display mode may be set as a default mode, and therefore the graphic map on which the current position of the vehicle is matched can be displayed and a corresponding route can be guided using the displayed graphic map, when the map display mode is not selected by the user.

On the other hand, when it is determined that the selected map display mode is a second display mode, the navigation apparatus 100 may guide a route while displaying the photographic map on which the current position of the vehicle is matched in the display 112 in operation 304.

In operation 305, the navigation apparatus 100 may determine whether the current position of the vehicle is within the non-matched range while guiding the route when the map display mode is the second display mode, and convert the map display mode from the second display mode to the first display mode when the current position of the vehicle is determined to be within the non-matched range.

That is, the navigation apparatus 100 may convert the photographic map displayed in the display 112 into the graphic map, and display the current position of the vehicle on the graphic map by matching the current position of the vehicle on the graphic map in operation 306.

Figure 5A:
FIGS. 5A and 5B are views showing an example of map displaying of a navigation apparatus in a vehicle according to an embodiment of the present inventive concept.
Figure 5B:

Referring to FIG. 5A, when a new bridge is constructed and an existing bridge (bridge within a circle in FIG. 5A) is disappeared, when a vehicle is positioned within a range including a position whose actual topography and photographic map are different from each other, a corresponding route may be guided while the position of the vehicle is displayed on the photographic map as shown in FIG. 5A, and then the corresponding route may be guided while the position of the vehicle is displayed on the graphic map after the photographic map is converted into the graphic map as shown in FIG. 5B.

In this instance, the navigation apparatus 100 can notify a user that the map display mode selected by the user is the second display mode but the corresponding map is displayed in the first display mode due to non-matching between the actual topography and the photographic map.

The navigation apparatus 100 may determine whether the current position of the vehicle is outside the non-matched range while converting and displaying the corresponding map in operation 307, and convert again the graphic map displayed in the display 112 into the photographic map to display the photographic map in operation 308 when the current position of the vehicle is determined to be outside the non-matched range.

That is, the navigation apparatus 100 may display the photographic map on which the current position of the vehicle is matched in the display 112.

The navigation apparatus 100 may delete the information about the non-matched position stored in the storage 140 when the photographic map of the non-matched position is transmitted from the server 200, and may update the photographic map of the non-matched position.

Figure 6:
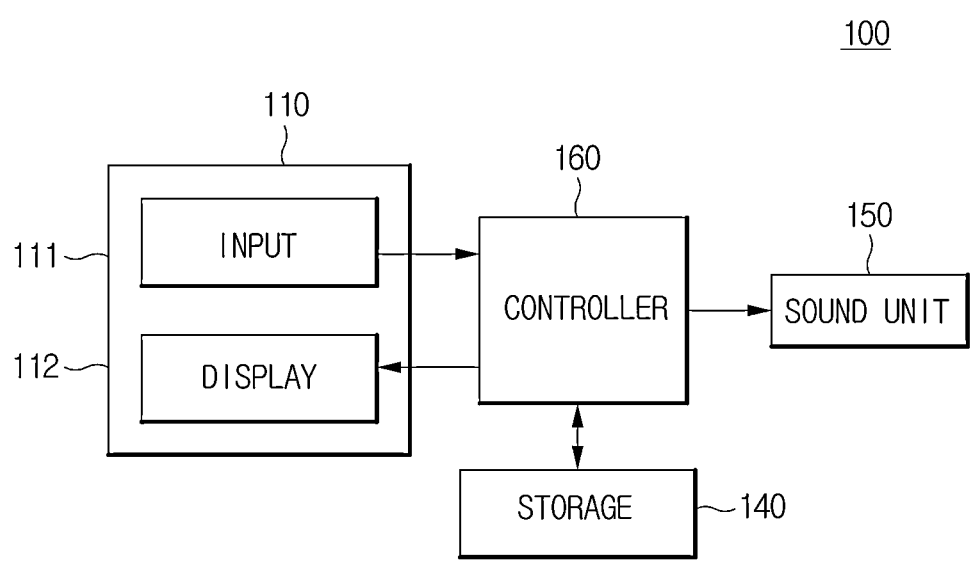
FIG. 6 is a control configuration view showing a navigation apparatus in a vehicle according to another embodiment of the present inventive concept.

FIG. 6 is a control configuration view showing a navigation apparatus in a vehicle according to another embodiment of the present inventive concept, and the same configuration as the above-described embodiment will be omitted.

The navigation apparatus 100 may change and store a photographic map and a graphic map which are stored in the navigation apparatus 100 by an installation program or an upgrade program.

The navigation apparatus 100 may include a non-matched position setting mode, and receive, from a user, position information which is not matched with a set photographic map when the non-matched position setting mode is selected.

Such a navigation apparatus will be described in more detail with reference to FIG. 6.

As shown in FIG. 6, the navigation apparatus 100 includes a user interface unit 110, a controller 160, storage 140, and a sound unit 150.

The user interface unit 110 may receive a command from a user, and display a map for guiding a route, road environment information, and operation information about the user's command.

Such a user interface unit 110 may include an input 111 and a display 112.

Here, the input 111 can be implemented by a touch panel, and the display 112 can be implemented by a flat display panel such as LCD. That is, the user interface unit 110 can be implemented by a touch screen in which a touch panel and a flat display panel are integrally formed.

In addition, the input 111 may further include at least one physical button such as a power on/off button.

Such an input 111 may transmit signals about the button selected by the user to the controller 160, and also transmit signals of a position touched on the touch panel by the user to the controller 160. The controller 160 may a microprocessor, a memory, and the like.

The input 111 may receive a map display mode for displaying a map.

Here, the map display mode may include a first display mode for displaying a graphic map and a second display mode for displaying a photographic map.

The input 111 may receive the non-matched position setting mode for receiving position information about the photographic map different from actual topography.

The input 111 may receive, from the user, position information about the photographic map different from the actual topography.

Here, receiving of the position information may include receiving any one point and a predetermined radius from the user, receiving any one point from the user, receiving an area name (name of administrative district) of any one point from the user, and receiving a touch range continuously touched by the user.

The display 112 may display a map related to traveling information, environment information of roads, and route guidance information in accordance with an instruction of the controller 160. That is, the display 112 may display a map on which a current position of a vehicle is matched, an operation state, and other additional information.

The display 112 may display the photographic map or the graphic map when displaying the corresponding map in the non-matched position setting mode, and therefore a user can select the non-matched position on the photographic map or the graphic map.

In addition, the photographic map and the graphic map can be displayed together in accordance with a command of the user.

The display 112 may display a popup window indicating that the non-matched position is set by the user.

In addition, when any one point is selected by the user, the display 112 can display a selection list of a predetermined radius for setting so that the user can set the radius. For example, the display 112 may display 1 km, 10 km, 20 km, and the like as the selection list of the predetermined radius.

When a destination is not inputted, the controller 160 may control guidance of roads and surrounding environments of the roads with respect to the current position of the vehicle in a general guidance mode, and may also control guidance of traveling information or the like.

When the destination is inputted, the controller 160 may perform control in a route guidance mode, search a route from the current position of the vehicle to the destination, perform map-matching of the searched route on a corresponding map, and then guide the route from the current position of the vehicle to the destination while displaying the map on which map-matching is performed.

When the first display mode is inputted to the input 111, the controller 160 may control the graphic map to be displayed in the display 112, and match the current position of the vehicle on the graphic map, so that the current position of the vehicle can be displayed on the graphic map.

When the second display mode is inputted to the input 111, the controller 160 may control the photographic map to be displayed in the display 112, and match the current position of the vehicle on the photographic map, so that the current position of the vehicle can be displayed on the photographic map.

The controller 160 may determine whether the current position of the vehicle is the non-matched position while performing the second display mode, control to convert the photographic map into the graphic map when the current position of the vehicle is determined to be the non-matched position, and display the current position of the vehicle on the graphic map by matching the current position of the vehicle on the graphic map.

When the current position of the vehicle is within the non-matched range, the controller 160 may control to convert the photographic map displayed in the display 112 into the graphic map.

When the current position of the vehicle is determined to be outside the non-matched range, the controller 160 may control to convert the graphic map displayed in the display 112 into the photographic map again. In this instance, the controller 160 may control the photographic map on which the current position and the route are matched to be displayed in the display 112.

When position information of the photographic map different from the actual topography is inputted to the input 111, the controller 160 may set the input position information as non-matched position information, and control the set non-matched position information to be stored in the storage 140.

When a non-matched position setting mode is inputted and any one point is selected, the controller 160 may control to display a radius selection list for radius setting, and when any one radius is selected by the user, the controller 160 may set and store the selected radius from the corresponding point as the non-matched range.

When the non-matched position setting mode is inputted and any one point is selected, the controller 160 can set a predetermined radius as the non-matched range.

When the non-matched position setting mode is inputted and any one point is selected, the controller 160 can verify an administrative district to which the selected point belongs, and set the verified administrative district as the non-matched range.

In addition, when the non-matched position setting mode is inputted and any one area's name is inputted, the controller 160 can set an administrative district of the input area's name as the non-matched range.

In addition, when the non-matched position setting mode is inputted and touch setting is selected, the controller 160 can control a display of a map including the current position of the vehicle, verify a touch range continuously touched by a user, verify a map position within the verified touch range, and set the verified map position as the non-matched range.

When the photographic map and graphic map for the same position stored in the storage 140 are additionally inputted, the controller 160 may update the stored photographic map or graphic map.

The navigation apparatus 100 may further include a port such as a USB provided in the main body or the like, and the communication unit can perform communication with an external device connected to the port or the like.

That is, the navigation apparatus 100 can receive position information of the photographic map different from the actual topography through map contents, a map program, and a map application of the external device connected to the port (not shown).

The storage 140 may store the graphic map for each position and the photographic map for each position, and store a radius setting list for radius setting.

The storage 140 may store the input non-matched position and non-matched range.

The sound unit 150 may output sounds related to a corresponding route, traveling information, map display mode changing alarm, music, video, and the like.

In addition, the navigation apparatus 100 can transmit position information of the photographic map different from the actual topography inputted by the user to the external device.

Figure 7:
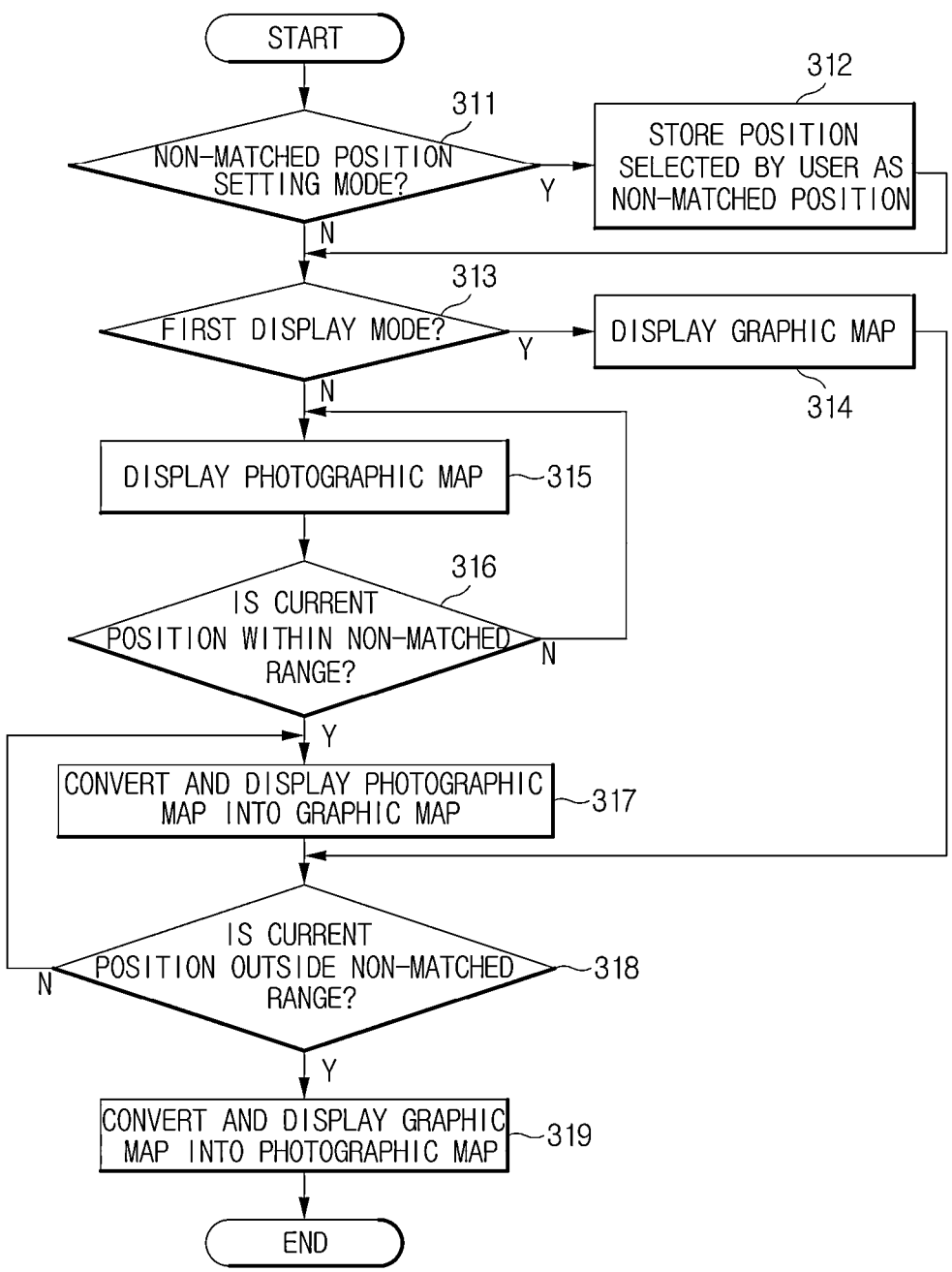
FIG. 7 is a control flowchart showing a navigation apparatus in a vehicle according to another embodiment of the present inventive concept.

FIG. 7 is a control flowchart showing a navigation apparatus in a vehicle according to another embodiment of the present inventive concept, which will be described with reference to FIGS. 8 and 9.

The navigation apparatus 100 may receive and store a photographic map and a graphic map from an external device when installing a program.

The navigation apparatus 100 may determine whether a non-matched position setting mode is selected after traveling or during traveling in operation 311, determine whether any one point is selected by a user when the non-matched position setting mode is determined to be selected, and set and store the point selected by the user as a non-matched position in operation 312.

This will be described in more detail.

When the non-matched position setting mode is selected by the user, the navigation apparatus 100 may display a lower menu for setting the non-matched position.

Figure 8:
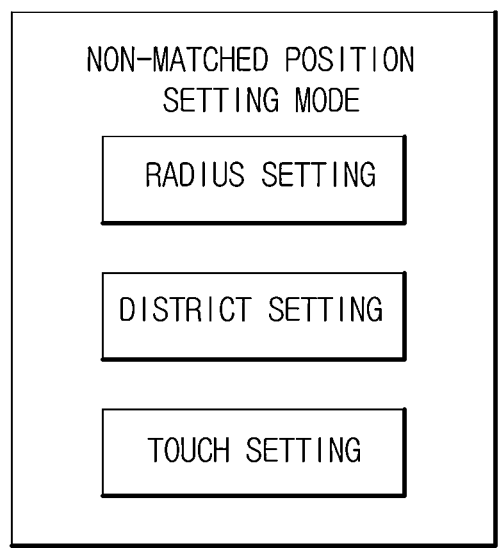
FIGS. 8 and 9 are views showing an example in which non-matching position setting of a navigation apparatus in a vehicle according to another embodiment of the present inventive concept.
Figure 9:
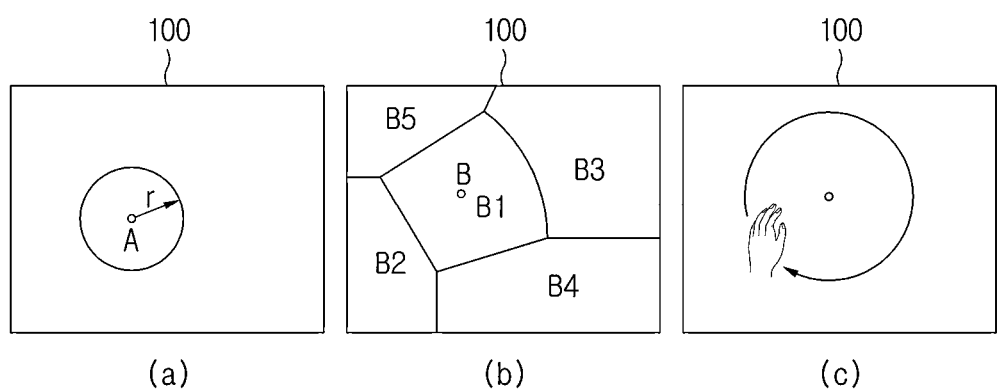

As shown in FIG. 8, the navigation apparatus may display a radius setting button, an area setting button, and a touch setting button as the lower menu.

As shown in FIG. 9A, when radius setting is selected, the navigation apparatus displays a map, and when any one point (A) is selected by the user, the navigation apparatus may display a radius example.

When any one radius is selected by the user, the navigation apparatus may set the selected radius (r) with respect to the selected any one point (A), as the non-matched range.

The navigation apparatus may receive a selection of the any one point on the graphic map and the photographic map.

As shown in FIG. 9B, when area setting is selected, the navigation apparatus may display a map, and when any one point (B) among a plurality of points (B1, B2, B3, B4, B5) is selected by the user, the navigation apparatus may verify of a name (B1) of an administrative district to which the selected point belongs and set the verified administrative district as the non-matched range.

In addition, the navigation apparatus can receive the name of the administrative district directly from the user, and set the received administrative district as the non-matched range.

As shown in FIG. 9C, when touch setting is selected, the navigation apparatus may display a map, verify a position of a touch point continuously touched by the user, and set the continuous position as the non-matched range.

In addition, the navigation apparatus can set a touch range touched during traveling as the non-matched range.

In this manner, the navigation apparatus may receive, directly from the user, information about a position whose actual topography is changed, and store the received position information as non-matched position information which is not matched with the photographic map.

The navigation apparatus 100 may verify a map display mode selected by the user, determine whether the verified map display mode is a first display mode in operation 313, and guide a route while displaying the graphic map on which the current position of the vehicle is matched in the display 112 in operation 314 when the verified map display mode is determined to be the first display mode.

In addition, the navigation apparatus 100 may output traveling information, surrounding environment information of roads, and the like through the display and the sound unit.

On the other hand, when the selected map display mode is determined to be the second display mode, the navigation apparatus 100 may guide the corresponding route while displaying the photographic map on which the current position of the vehicle is matched in the display 112 in operation 315.

When the map display mode is the second display mode, the navigation apparatus 100 may determine whether the current position of the vehicle is within the non-matched range in operation 316 while guiding the route, and convert the map display mode from the second display mode to the first display mode when the current position of the vehicle is determined to be within the non-matched range.

That is, the navigation apparatus may convert the photographic map displayed in the display 112 into the graphic map, and display the current position of the vehicle on the graphic map by matching the current position of the vehicle on the graphic map in operation 317.

The navigation apparatus 100 may determine whether the current position of the vehicle is outside the non-matched range in operation 318 during converting and displaying the corresponding map, and convert and displays again the graphic map displayed in the display 112 into the photographic map in operation 319 when the current position of the vehicle is determined to be outside the non-matched range.

That is, the navigation apparatus 100 may display the photographic map on which the current position of the vehicle is matched, in the display 112.

Such a navigation apparatus 100 can receive position information of the photographic map different from actual topography from the server, store the received position information as the non-matched position information, and then use the stored position information at the time of route guidance.

Figure 10:
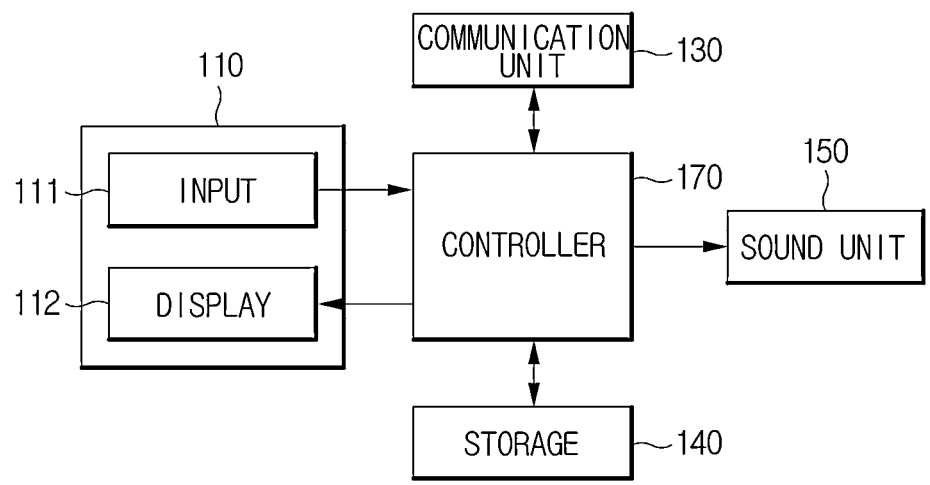
FIG. 10 is a control configuration view showing a navigation apparatus in a vehicle according to still another embodiment of the present inventive concept.

FIG. 10 is a control configuration view showing a navigation apparatus in a vehicle according to still another embodiment of the present inventive concept, and the same configuration as the above-described embodiment will be omitted.

As shown in FIG. 10, the navigation apparatus 100 includes a user interface unit 110, a communication unit 130, a controller 170, storage 140, and a sound unit 150. The controller 170 may a microprocessor, a memory, and the like.

The user interface unit 110 may be the same as that of the above-described embodiment, and the same description thereof will be omitted.

The communication unit 130 may receive at least one of a photographic map and a graphic map from a server.

In addition, the navigation apparatus can receive update information from an external device connected to a port of the main body.

The controller 170 may update the photographic map and graphic map stored in the storage 140 based on the received photographic map and graphic map for each position.

When the graphic map is updated, the controller 170 may compare the updated graphic map and the photographic map stored in the storage for each position to thereby determine whether the two maps are matched with each other, determine that corresponding topography is changed when the two maps are not matched with each other, verify a position whose topography is changed, and set the verified position as a non-matched position.

The controller 170 may set any one point of the non-matched position as a center point, and set a range within a predetermined radius from the set center point as the non-matched range, and store information about the set non-matched range.

In addition, the controller 170 can determine whether a position where a vehicle travels during traveling is the non-matched position.

That is, the controller 170 may verify a display area displayed during traveling and a non-display area continuous to the display area, verify a position of the non-display area of an area in which the vehicle travels in the non-display area, and determine whether the verified position is the non-matched position.

When the first display mode is inputted to the input 111, the controller 170 may control the graphic map to be displayed in the display 112, and match the current position of the vehicle on the graphic map, so that the current position of the vehicle can be displayed on the graphic map.

When the second display mode is inputted to the input 111, the controller 170 may control the photographic map to be displayed in the display 112, and match the current position of the vehicle on the photographic map, so that the current position of the vehicle can be displayed on the photographic map.

The controller 170 may determine whether the current position of the vehicle is the non-matched position while performing the second display mode, control to convert the photographic map into the graphic map when the current position of the vehicle is determined to be the non-matched position, and display the current position of the vehicle on the graphic map by matching the current position of the vehicle on the graphic map.

When the current position of the vehicle is within the non-matched range, the controller 170 may control to convert the photographic map displayed in the display 112 into the graphic map.

When the current position of the vehicle is determined to be outside the non-matched range, the controller 170 may control to convert the graphic map displayed in the display 112 into the photographic map again. In this instance, the controller 170 may control the photographic map on which the current position of the vehicle is matched to be displayed in the display 112.

When the graphic map and the photographic map are different from each other in a state in which the photographic map is more recently updated than the graphic map with respect to the same position, the controller 170 can control to convert the graphic map into the photographic map to display the photographic map at the time of the graphic map display mode.

The controller 170 can verify an update date and time of each of the graphic map and the photographic map of the same position, and transmit position information of the graphic map to the navigation apparatus 100 when the two maps are not matched with each other in a state in which the update date and time of the photographic map are more recent than the update date and time of the graphic map.

The navigation apparatus 100 may further include a port such as a USB provided in the main body, and the communication unit can perform communication with the external device connected to the port or the like.

That is, the navigation apparatus 100 can receive position information of the photographic map different from the actual topography through map contents, a map program, and a map application of the external device connected to the port (not shown).

The storage 140 may store the graphic map for each position and the photographic map for each position.

The storage 140 may store the input non-matched position and non-matched range.

The sound unit 150 may output sounds related to a corresponding route, traveling information, a map display mode changing alarm, music, video, and the like.

Figure 11:
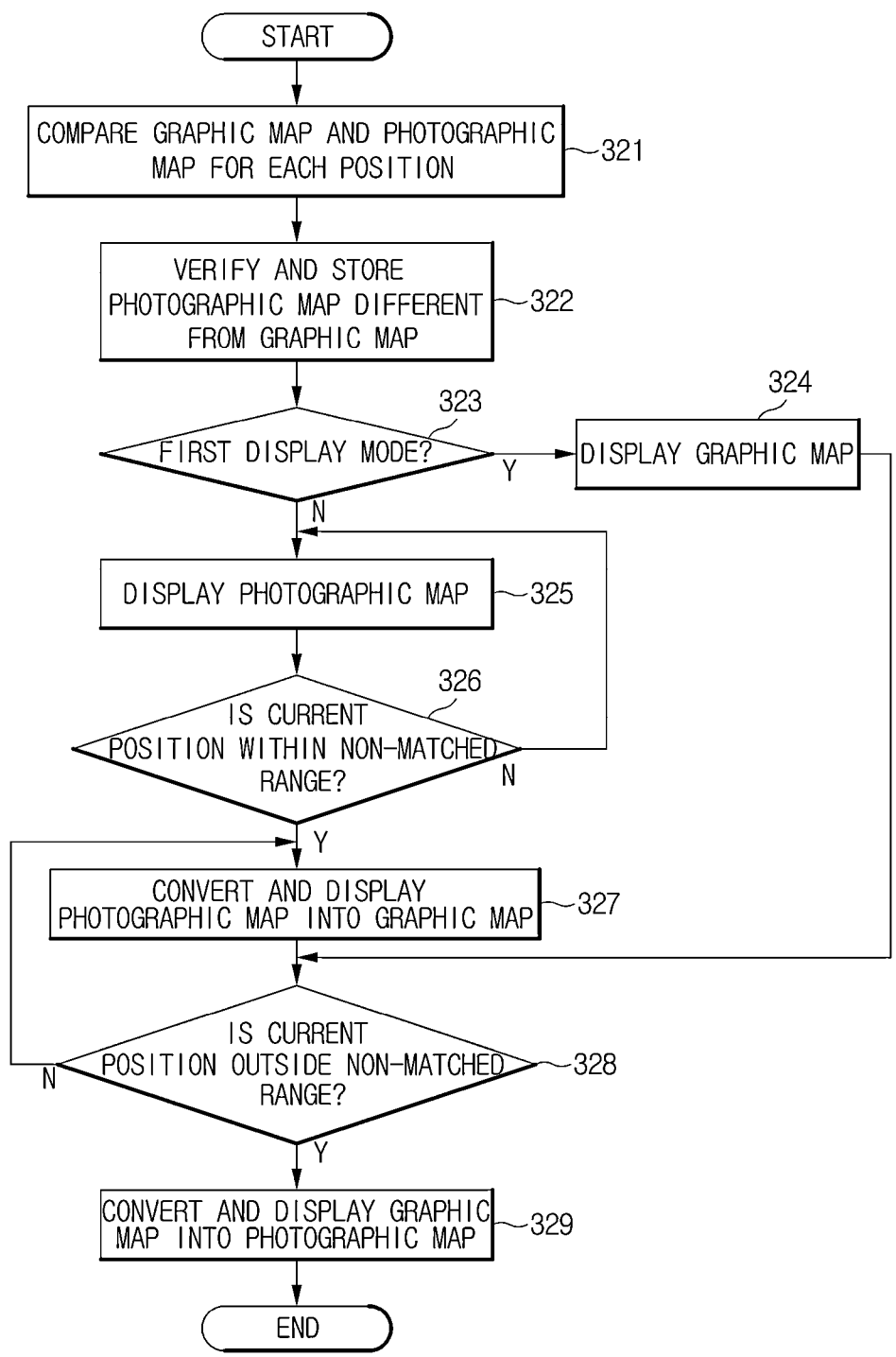
FIG. 11 is a control flowchart showing a navigation apparatus in a vehicle according to still another embodiment of the present inventive concept.

FIG. 11 is a control flowchart showing a navigation apparatus in a vehicle according to still another embodiment of the present inventive concept, which will be described with reference to FIG. 12.

The navigation apparatus 100 may receive a photographic map and a graphic map from an external device when installing a program, and store the received maps.

The navigation apparatus 100 may initially store the photographic map for each position and the graphic map for each position, determine whether the graphic map and the photographic map are matched with each other by comparing, when the graphic map is additionally provided to be updated, the updated graphic map and the photographic map in operation 321, verify, when the two maps are not matched with each other, a position of the non-matched map, and store the verified position as the non-matched position in operation 322.

The navigation apparatus 100 may verify a map display mode selected by a user, determine whether the verified map display mode is the first display mode in operation 323, and guide a corresponding route while displaying the graphic map on which a current position of the vehicle is matched in the display 112 in operation 324 when the verified map display mode is determined to be the first display mode.

In addition, the navigation apparatus 100 may output traveling information, surrounding environment information of roads, and the like through the display and the sound unit.

On the other hand, when the selected map display mode is determined to be the second display mode, the navigation apparatus 100 may guide the corresponding route while displaying the photographic map on which the current position of the vehicle is matched in the display 112 in operation 325.

When the map display mode is the second display mode, the navigation apparatus 100 may determine whether the current position of the vehicle is within the non-matched range while guiding the corresponding route in operation 326, and convert the map display mode from the second display mode to the first display mode when the current position of the vehicle is determined to be within the non-matched range.

The navigation apparatus may display a map having a predetermined radius with respect to the current position of the vehicle, and set a map having a size larger than a map having a predetermined size as a displayable map while considering that the map can be reduced and enlarged by a user.

Thus, the navigation apparatus may also recognize information about a map of a non-display area which is not displayed in the display when displaying the corresponding map in the display.

Figure 12:
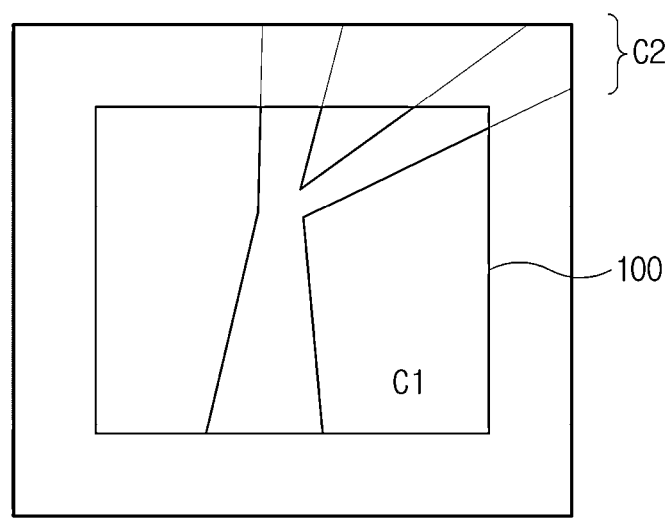
FIG. 12 is a view showing an example in which non-matching position setting of a navigation apparatus in a vehicle according to still another embodiment of the present inventive concept.

As shown in FIG. 12, the navigation apparatus 100 may verify a display area (c1) displayed during traveling and a non-display area continuous to the display area, verify a position of a non-display area (c2) of a front area in which a corresponding vehicle is to travel in the non-display area, and determine whether the verified position is a non-matched position in real time.

That is, when the position of the front area in which the vehicle is to travel is the non-matched position, the navigation apparatus 100 may convert the photographic map displayed in the display 112 into the graphic map, and display the current position of the vehicle on the graphic map by matching the current position of the vehicle on the graphic map in operation 327.

The navigation apparatus 100 may determine whether the current position is outside the non-matched range while converting and displaying the corresponding map in operation 328, and convert the graphic map displayed in the display 112 into the photographic map again to display the photographic map when the current position of the vehicle is determined to be outside the non-matched range in operation 329.

That is, the navigation apparatus 100 may display the photographic map on which the current position of the vehicle is matched, in the display 112.

The navigation apparatus 100 may store the photographic map and graphic map by an installation program or an upgrade program, and receive position information of the photographic map different from the actual topography from a user or a server.

As is apparent from the above description, the navigation apparatus according to embodiments of the present inventive concept may automatically update a position whose actual topography and aerial photographic map are different from each other, and receive position information directly from a user. Thus, the navigation apparatus may easily collect and store positions of the non-matched photographic map.

In addition, when the actual topography and the aerial photographic map do not coincide with each other, the navigation apparatus may convert the display mode for displaying a map from the photographic map display mode into the graphic map display mode, thereby almost always providing an accurate map to the user.

In this manner, the navigation apparatus may determine an optimized map suitable for an area in which a vehicle is currently positioned, and maintain or convert a display mode of the determined map to thereby guide a route. As a result, the quality of the navigation apparatus may be improved to increase the user's satisfaction, and the user's convenience and safety of the vehicle may be improved.

In addition, when new roads are created or existing roads disappear due to about 2 years of the update cycle of the aerial photographic map, the navigation apparatus according to embodiments of the present inventive concept may reduce problems such as providing a wrong aerial photographic map to the user.

Although a few embodiments of the present inventive concept have been shown and described, it would be appreciated by those skilled in the art that changes may be made in these embodiments without departing from the principles and spirit of the inventive concept, the scope of which is defined in the claims and their equivalents.

What is claimed is:

1. A navigation apparatus, comprising:
   storage configured to store a graphic map, a photographic map, and a position of the photographic map non-matched with actual topography;
   a communication unit configured to receive a current position of a vehicle, wherein the communication unit includes a Global Positioning System (GPS) unit;
   a controller configured to receive the current position of the vehicle through the communication unit, determine whether the received current position of the vehicle is the non-matched position when a map display mode is a photographic map display mode, convert the photographic map into the graphic map to display the graphic map when the received current position of the vehicle is the non-matched position, maintain a display of the converted graphic map when the received current position of the vehicle is within a predetermined radius from the non-matched position, and convert the converted graphic map into the photographic map when the received current position of the vehicle is outside the predetermined radius from the non-matched position; and
   a display configured to display the graphic map or the photographic map and display the received current position of the vehicle on the graphic map or the photographic map.

2. The navigation apparatus according to claim 1:
   wherein the communication unit is configured to receive a position of the photographic map non-matched with the actual topography from a server, the communication unit includes at least one of a broadcasting network or a Universal Serial Bus (USB) communication, and
   wherein the controller is configured to control the received position to be stored as the non-matched position when the non-matched position is received.

3. The navigation apparatus according to claim 1, further comprising an input configured to receive a position of the photographic map non-matched with the actual topography, wherein the controller is configured to control the received position to be stored as the non-matched position.

4. The navigation apparatus according to claim 1, wherein the controller is configured to determine whether to perform matching by comparing the graphic map and the photographic map, confirm a position of a non-match position, and store the confirmed position as the non-match position when the graphic map and the photographic map are not matched.

* * * * *